Figure 1:
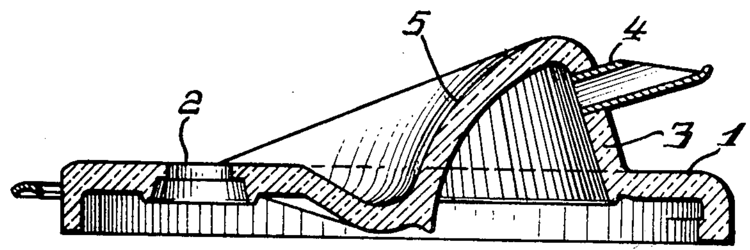

Feb. 21, 1956 F. J J J HENRARD 2,735,399

MILKING APPARATUS

Filed Jan. 15, 1954 4 Sheets-Sheet 1

INVENTOR.
Fernand J. J. J. Henrard
BY
Schroeder, Merriam, Hofgren & Brady
Attorneys INVENTOR.
Fernand J.J.J. Henrard
BY
Schroeder, Merriam, Hofgren & Brady
attorneys Feb. 21, 1956 F. J J J HENRARD 2,735,399

MILKING APPARATUS

Filed Jan. 15, 1954 4 Sheets-Sheet 3

INVENTOR.

Fernand J.J.J. Henrard

BY

Schroeder, Merriam, Hofgren & Brady

Attorneys

INVENTOR.
Fernand J. J. J. Henrard
BY
Schroeder, Merriam, Hofgren & Brady
Attorneys United States Patent Office 2,735,399

Patented Feb. 21, 1956

2,735,399

MILKING APPARATUS

Fernand J. J. J. Henrard, Remicourt, Belgium, assignor to Babson Bros. Co., a corporation of Illinois Application January 15, 1954, Serial No. 404,360

Claims priority, application Netherlands April 25, 1953

1 Claim. (Cl. 119—14.46)

The present invention has reference to the covers of milking-cans for milking machines.

The entirely or partially transparent covers of the known type have in the main the inconvenience of losing partially their transparence in the course of milking, which reduces the visibility which is sought precisely to be obtained through the utilization of the transparent material, and causes the desired advantages to disappear, particularly that of the observation of the exact moment of the end of milking in order to permit the removal of the nipples from the udder portions emptied of their milk before the complete conclusion of the milking and thus avoid the physiological accidents which can be produced by the continuation of the milking action on dried up teats.

This diminution of the transparence arises from the fact that, during the milking a vapor of water steam condenses on the inner surface of the cover inasmuch as the milk gathered in the milking-can is subject to a depression of about 40 cm. of mercury with a temperature of 37° C., which gives rise to evaporation.

Moreover, the streams of milk expelled from the teats at the moment of the compression of the rubber nipples arrive with a certain lively force in contact with the bottom of the pail or with the level of the milk stored there, which produces projections of droplets of milk which, splashing in all directions, deposit on the inner surface of the transparent cover.

The condensed water steam and the droplets of projected milk adhere to the cover and thus soon reduce the transparence and consequently the visibility.

In order to remedy the above mentioned inconvenience, the cover includes one or several parts which constitute transparent receiving surfaces against which the stream or streams of milk are hurled in such a manner that this or these parts are constantly washed by the milk thus permitting a continual removal of the condensed vapor and the elimination of the deposits of projected droplets of milk.

In order to have the invention well understood, there will be described hereinafter four forms of execution of covers conceived in such a manner as to permit the application of the process.

Figure 2:
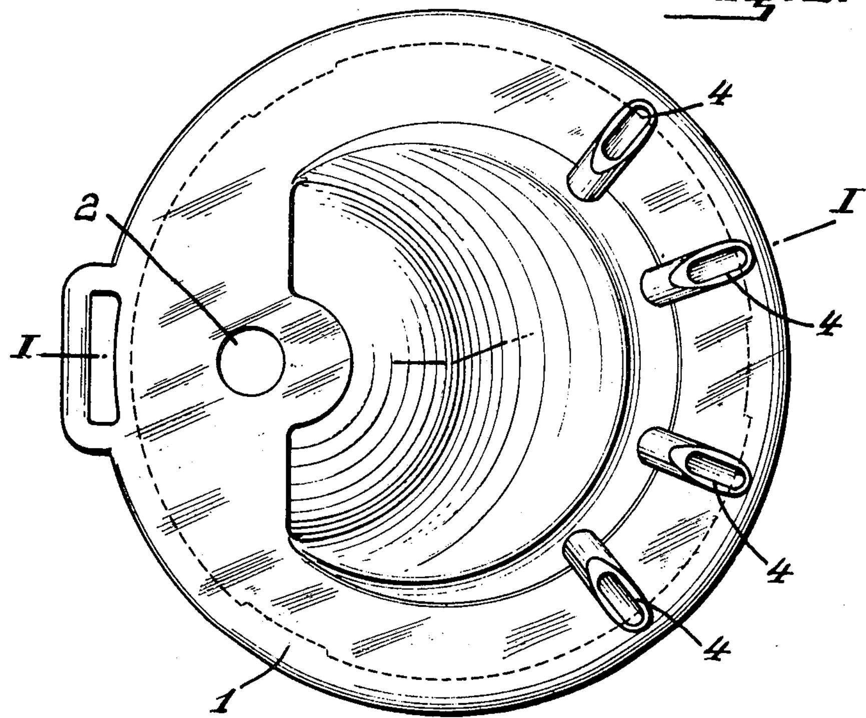

Figures 1 and 2 have reference to a first form of application, Figure 1 being a cross-section through the line I—I in the Figure 2, and Figure 2 a plan view.

Figure 3:
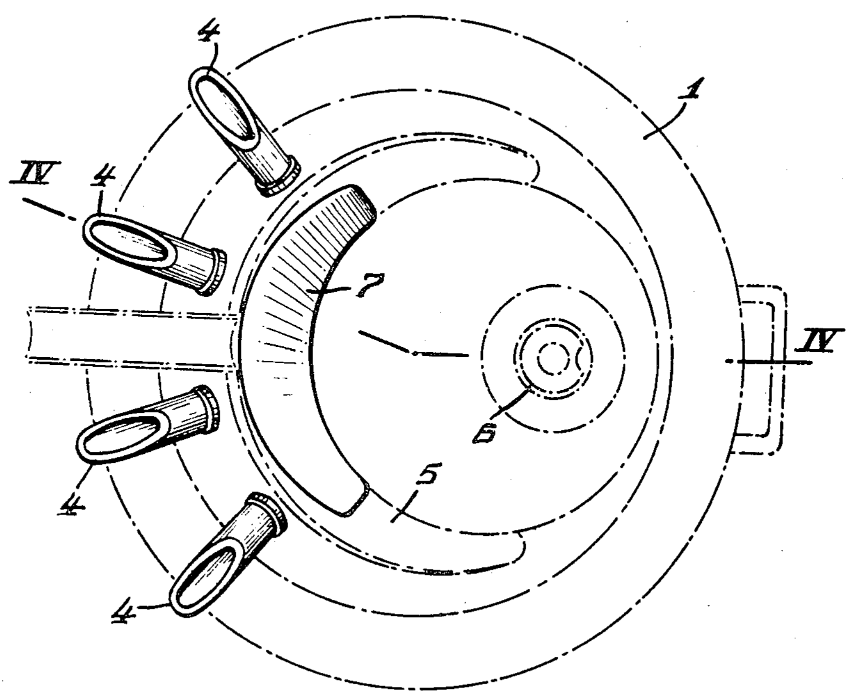
Figure 4:
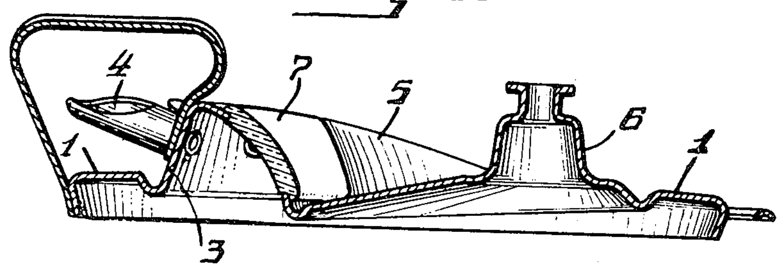

Figures 3 and 4 have reference to a second form of application, Figure 3 being a plan view, and Figure 4 a cross-section through the line IV—IV in Figure 3.

Figure 5:
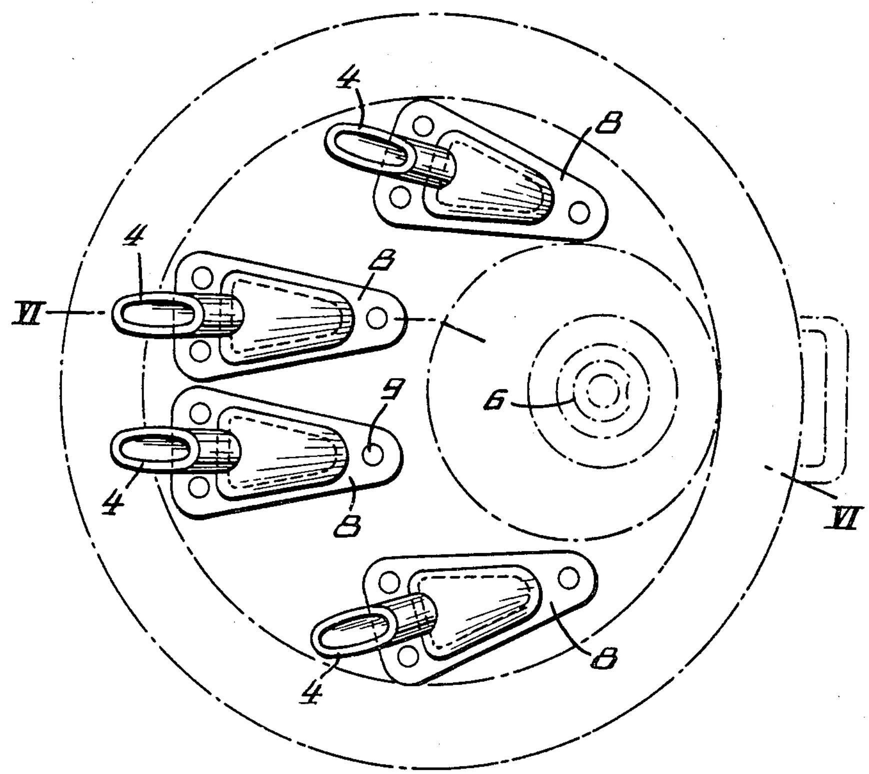
Figure 6:
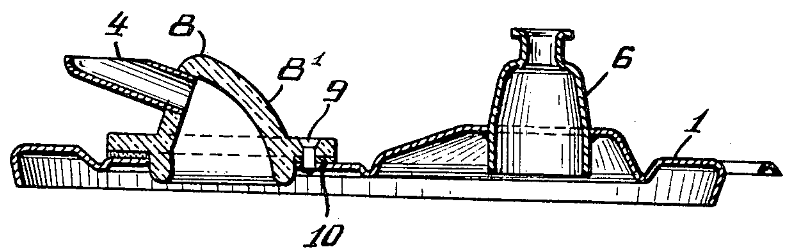

Figures 5 and 6 represent a third form of application, Figure 5 being a plan view, and Figure 6 a cross-section through the line VI—VI in Figure 5.

Figure 7:
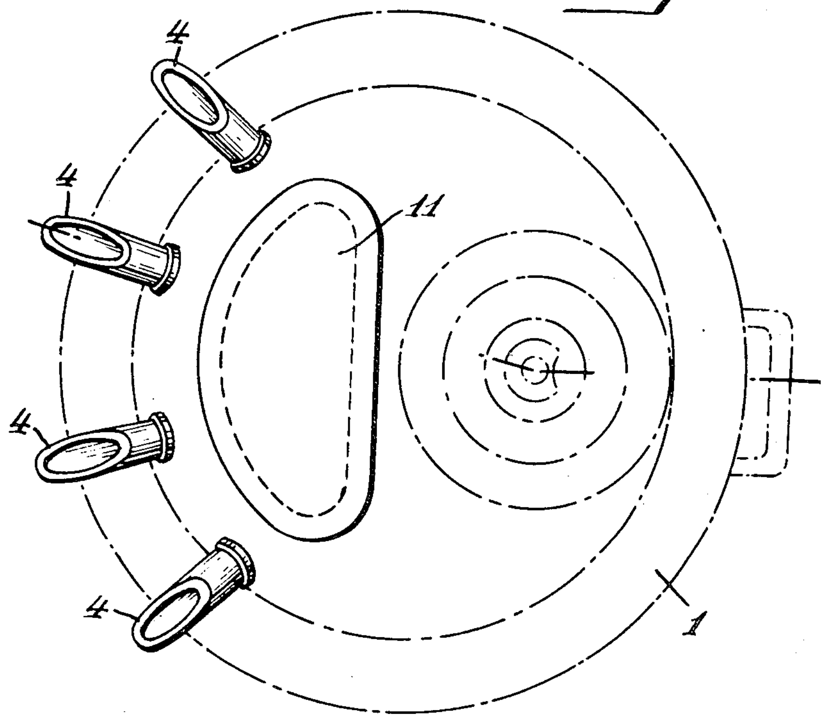
Figure 8:
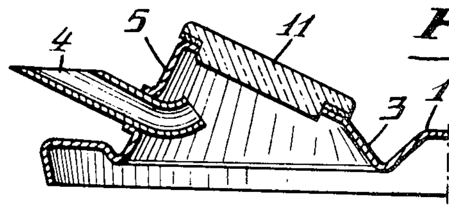
Figure 9:
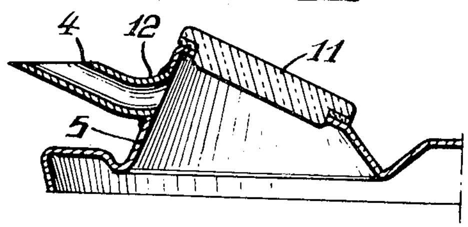

Figures 7, 8 and 9 have reference to a fourth form of execution. Figure 7 is a plan view, and Figures 8 and 9 two vertical cross-sections in places where transparent sights are provided.

In the description which will follow, there will be designated as "front part" of the cover the part directed toward the udder of the animal, and as "rear part" the part situated toward the head of the animal.

In Figures 1 and 2 of the attached drawings, a cover 1 is represented provided with an opening 2 for receiving the pulsator and in which, as described in Thomas, U. S. Patent 2,610,609, a part 3 of the front of the cover shaped in such a manner that it rises with relation to the general plane of the cover, serves for the attachment of the connections 4 of the nipples. To this part is connected another part 5 which is inclined toward the rear of the cover, and which with the part 3 forms a pocket of sufficient size to permit easy cleaning.

According to the invention, the direction of the milk delivery nozzles and the form of the receiving wall 5 are such that this receiving surface is constantly washed by the four streams of milk coming out of the teats, which permits a continuous removal of the condensed vapor and the elimination of the deposits of projected droplets of milk by the rapid and tumultuous arrival of the milk in the receptacle.

The inclination of the connections 4 should be such that when one or another milking-cup is accidentally or intentionally separated from a teat, a closing of the connections is obtained. Moreover, the inclination should be maintained such that the drawn milk, expelled from the teats, does not suffer impediments in its course toward the milking receptacle, which would increase the duration of the milking, and moreover that the effect of traction on the teats is properly directed to avoid any rising of the milking-cup toward the base of the udder thus leaving the reservoirs of the udder in free communication with the passage ducts of the milk from the teats.

The connection tubes can naturally each have a radial direction with relation to the vacuum grip of the cover or have directions approximately parallel to the median vertical plane of the cover.

In the application shown in Figures 1 and 2, the surfaces 3 and 5 leading to the creation of the pocket are both entirely transparent and the connections 4 are arranged in such a manner as to satisfy the conditions set forth above, both from the point of view of the washing of the surface 5 and the closing of the connections in case of disconnection of a milking-cup and maintenance of the effect of traction on the udders.

Figures 3 and 4 in which there is represented at 6 a projection serving for the attachment of the pulsator, have reference to a metal cover 1 which presents the same ensemble conformation as the cover of transparent material of Figure 1.

According to the invention, the part 5 which cooperates with the part 3 with a view to the formation of the pocket, possesses a receiving surface 7 which is alone of transparent material and which is arranged in such a manner that the streams of milk are hurled on this surface and the latter is constantly washed by these streams.

Figures 5 and 6 represent a metal cover 1 on which are applied 4 casings 8 of transparent material to which are connected the joining tubes 4. These casings can be attached on the cover by gluing, screwing or by means of rivets 9 with or without interposition of a gasket 10.

In this application, the direction of the streams of milk coming from the joining tubes and the form of the rear surface of each casing are such that this rear surface 8' is swept and washed by the stream of milk.

As the drawing shows, the receiving surface 8' of the casings possesses a curve such that the final direction of the spread out streams is practically normal to the level of the milk stored in the milking-can.

Figures 7, 8 and 9 represent a metal cover in which the part forming a pocket is equipped with a transparent sight 11 on the surface situated opposite the one (5) receiving the joining tubes 4. These latter are in this construction curved at their end in such a way that the streams of milk permit the continual washing of the transparent part of the cover.

In the case of Figure 8, the joining tubes meet the surface 5 of the pocket in a perpendicular direction or practically perpendicular, then curve back inside the pocket whereas in Figure 9 they join at the surface 5 with a certain curve represented at 12, chosen in such a manner as to satisfy the aforesaid condition according to the invention with a view to maintaining the transparence of the sight 11.

While I have shown and described certain embodiments of my invention, it is to be understood that it is capable of many modifications. Changes therefore, in the construction and arrangement may be made without departing from the spirit and scope of the invention as disclosed in the appended claim.

I claim:

A lid of the character described for a milking device, comprising: a lid member having an upstanding arcuate portion adjacent the front edge thereof merging into a downwardly extending rear surface, at least a portion of said rear surface being transparent; and a plurality of straight tubular members adapted for attachment to the milk tubes of a teat cup assembly, integrally mounted in the front surface of said upstanding portion near the top thereof, each member having an axial opening therethrough and terminating a substantial distance from said transparent rear surface, the axis of each member being aligned to intersect a midportion of said transparent portion at an angle, directing the flow of milk thereagainst to wash said portion continually, preventing the accumulation of condensate thereon.

References Cited in the file of this patent

UNITED STATES PATENTS

| | | |
|---|---|---|
| 1,859,213 | McCornack | May 17, 1932 |
| 2,329,396 | Dinesen | Sept. 14, 1943 |
| 2,376,717 | Omdalen | May 22, 1945 |
| 2,466,841 | Eades | Apr. 12, 1949 |
| 2,610,609 | Thomas | Sept. 16, 1952 |